United States Patent [19]
Tellier

[11] Patent Number: 5,496,388
[45] Date of Patent: Mar. 5, 1996

[54] SYSTEM FOR COMPRESSING AIR AND EXTRACTING NITROGEN FROM COMPRESSED AIR

[75] Inventor: Nils E. Tellier, Walnut Creek, Calif.

[73] Assignee: Air Liquide America Corporation, Walnut Creek, Calif.

[21] Appl. No.: 269,768

[22] Filed: Jul. 1, 1994

[51] Int. Cl.$^6$ .......................... B01D 35/157; B01D 53/22
[52] U.S. Cl. .................... 55/210; 96/4; 96/111; 96/113; 96/117
[58] Field of Search .................. 95/8, 12, 14, 22, 95/23; 96/4, 7–10, 109, 111, 113, 114, 117, 140, 142; 55/210

[56] References Cited

U.S. PATENT DOCUMENTS

| | | | |
|---|---|---|---|
| 4,421,529 | 12/1983 | Revak et al. | 96/8 X |
| 4,556,180 | 12/1985 | Manatt | 96/8 X |
| 4,806,132 | 2/1989 | Campbell | 55/16 |
| 5,063,753 | 11/1991 | Woodruff | 96/8 X |
| 5,118,327 | 6/1992 | Nelson et al. | 96/4 X |
| 5,120,329 | 6/1992 | Sauer et al. | 95/8 |
| 5,152,966 | 10/1992 | Roe et al. | 96/8 X |
| 5,266,101 | 11/1993 | Barbe et al. | 95/23 |
| 5,281,253 | 1/1994 | Thompson | 95/22 |
| 5,302,189 | 4/1994 | Barbe et al. | 95/22 X |
| 5,308,382 | 5/1994 | Prasad | 95/12 |

OTHER PUBLICATIONS

Brochure, "Praxair NitroGEN membrane system", Praxair Corporation, one page.
Gardner–Denver Brochure, Electra–Saver Rotary Screw Air Compressor, 13 pages, 1988.
Sullair Corporation Brochure, 150 & 200 HP Stationary Compressor, 4 pages, 1989.

*Primary Examiner*—Robert Spitzer
*Attorney, Agent, or Firm*—Burns, Doane & Mathis

[57] ABSTRACT

A system for extracting nitrogen from air to produce a flow of nitrogen includes a compressor for compressing air and an air separator connected to the compressor for producing nitrogen from the compressed air. The compressor is provided with a reducing device for reducing an effective length of the rotatable rotors which acts to compress air in order to cause the compressor to operate at less than full capacity. An internal pressure control regulator operatively associated with the compressor regulates the discharge pressure from the compressor and provides a signal air pressure when the compressor discharge pressure exceeds a predetermined pressure. An external input device allows an external signal indicative of a compressor operating level that is less than full capacity to be inputted and provides a signal air pressure based on the external signal. The reducing device is made operational either automatically on the basis of the signal air pressure from the internal pressure control regulator or manually on the basis of the signal air pressure from the external input control device. The system can also be designed to vary the operating level of the compressor when the purity of the nitrogen changes as a result of a change in the nitrogen flow demand.

11 Claims, 3 Drawing Sheets

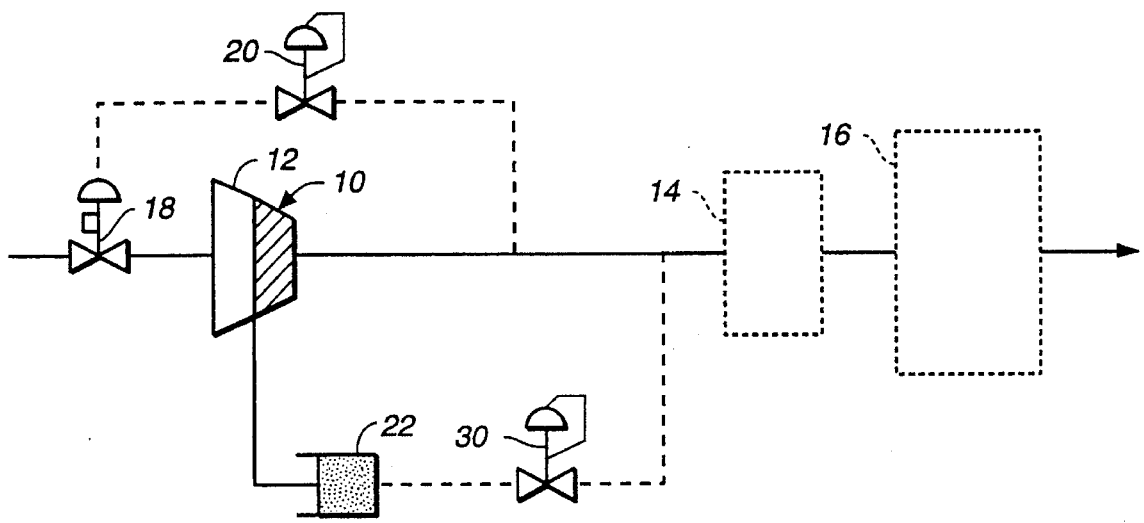
FIG._1
(PRIOR ART)
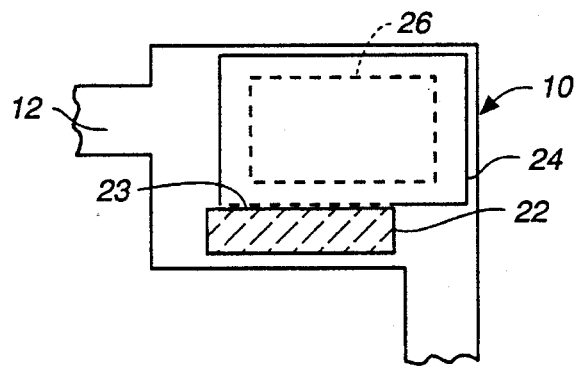
FIG._2
(PRIOR ART)

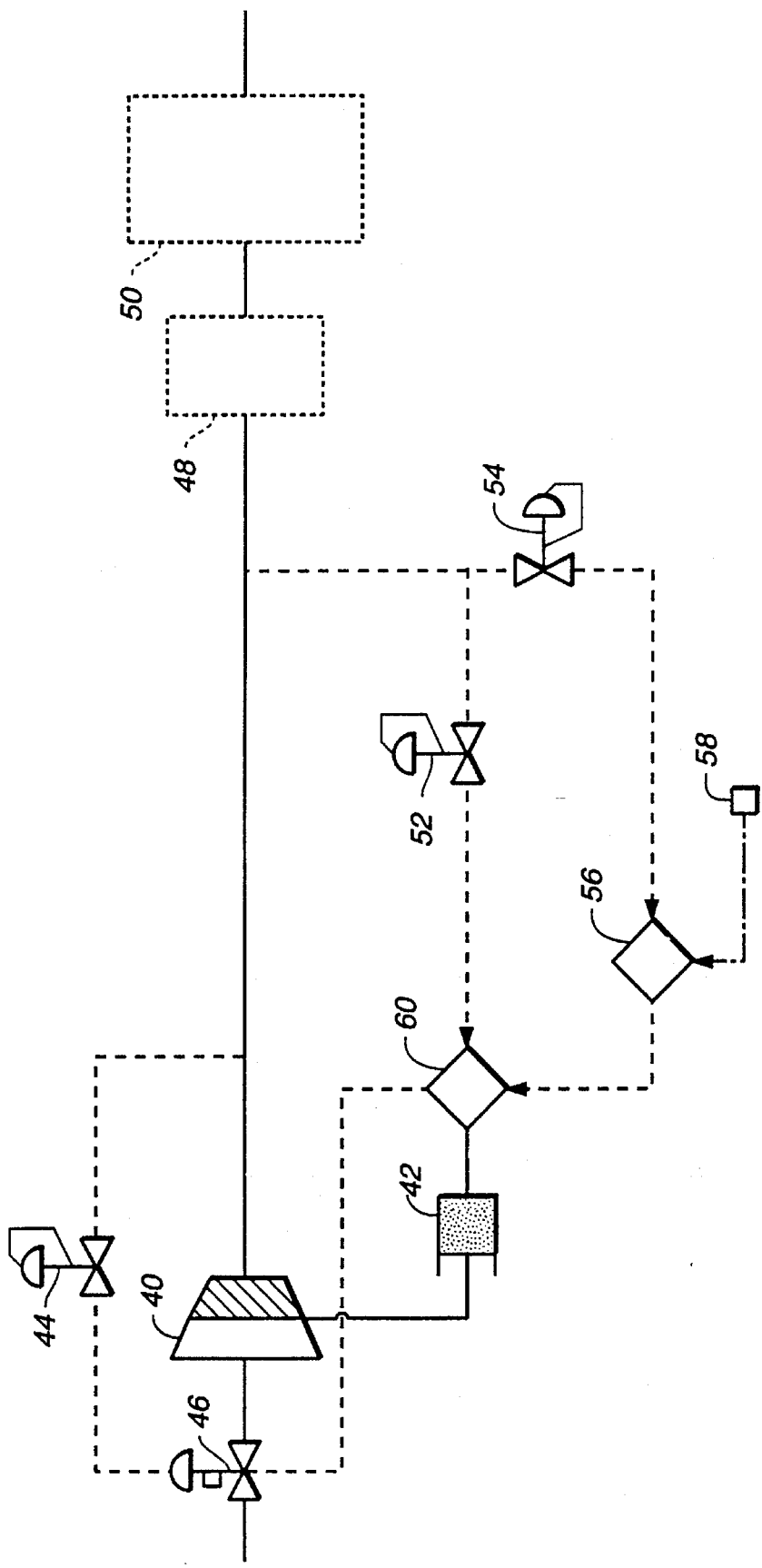
FIG._3

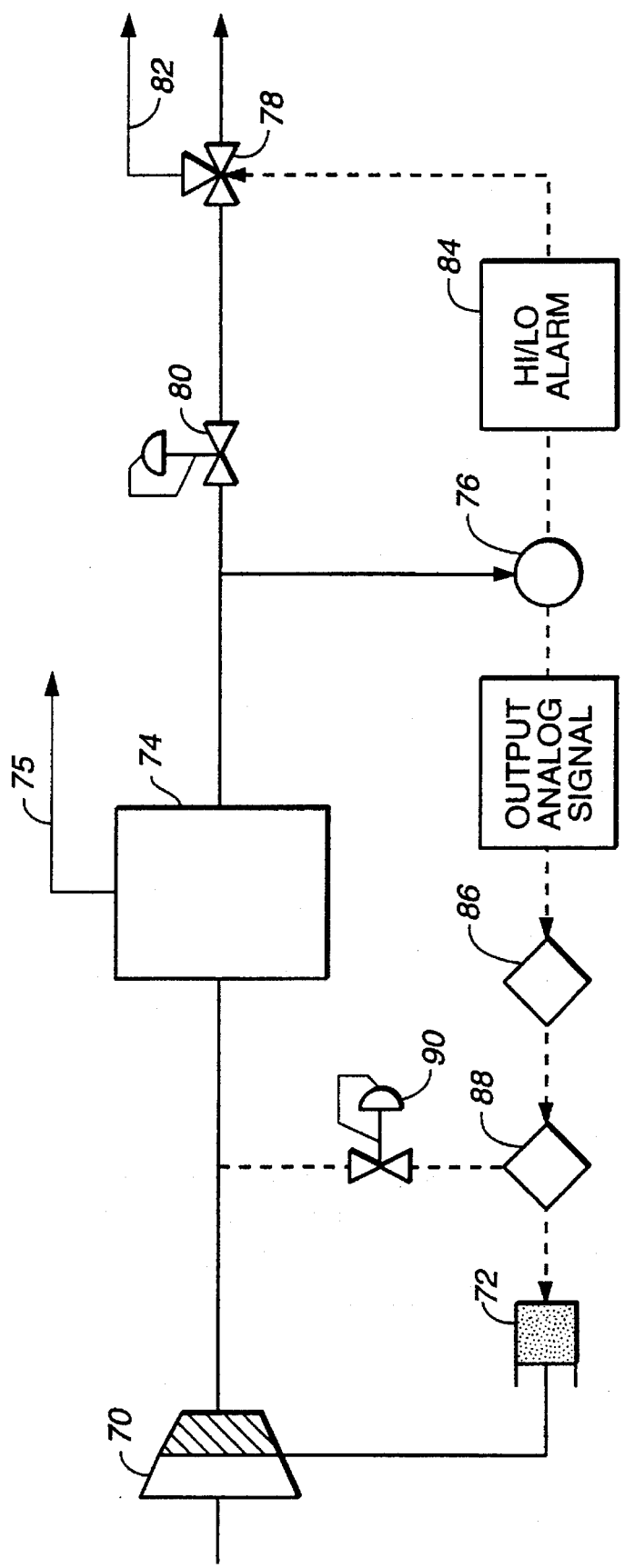
FIG._4

SYSTEM FOR COMPRESSING AIR AND EXTRACTING NITROGEN FROM COMPRESSED AIR

FIELD OF THE INVENTION

The present invention relates to air compressors and more particularly to control systems useful for controlling screw air compressors that compress air in nitrogen extraction systems.

BACKGROUND OF THE INVENTION

Screw air compressors are used in a variety of situations to compress air. One such use of screw air compressors is in the context of a nitrogen extraction system. In such a system, atmospheric air is initially compressed in the screw air compressor. The compressed air is then sent to an air separation system such as a membrane permeator, a pressure swing absorber, a cryogenic distillation column, or the like. Along the way, the compressed air can be conveyed through an appropriate cleaner to clean the air of condensate water, oil fumes and other contaminates. In the air separation system, nitrogen is separated from air to produce a nitrogen product having a desired purity, measured in terms of residual fraction of oxygen.

Generally speaking, in these types of systems which employ an air compressor, the desired purity of the resulting product dictates the amount of power consumed by the system, assuming a constant flow rate. That is, assuming power consumption is constant, more product (i.e., higher flow rate) can be produced with a lower product purity, or less product can be obtained with a higher product purity.

FIG. 1 illustrates some of the features and components of a known system for extracting nitrogen from compressed air. The system includes a screw air compressor 10 provided with an inlet 12 for allowing atmospheric air to be introduced into the casing of the compressor. In a known manner, a pair of rotors (not specifically shown in FIG. 1) are disposed within the casing of the screw air compressor 10 to effect compression of the air. Located downstream of the screw compressor 10 is a cleaner 14 for cleaning the compressed air of condensate water, oil fumes and other contaminates. Located downstream of the cleaner 14 is an air separation system which, as noted above, can be of various types such as a membrane permeator, a pressure swing absorber, or a cryogenic distillation column.

During operation, air is compressed in the screw air compressor and is fed downstream to the air separation system 16. The nitrogen which is then extracted from the compressed air in the air separation system 16 is directed downstream for use in the particular application for which it is intended.

With the compressor operating at full capacity, it often-times happens that the flow demand for extracted nitrogen decreases. In such a situation, continued operation of the screw air compressor 10 at full capacity will produce nitrogen having a purity greater than necessary. That is because the oxygen content in the nitrogen product will decrease. Depending upon the particular application, nitrogen having a product purity that is greater than required by specifications may be problematic. Even if the higher than necessary product purity does not present a potential problem for the particular use intended, it does nonetheless require expenditure of energy that exceeds the amount necessary for producing a product having a purity that is within specifications. Consequently, energy is wasted, and the life and longevity of the compressor is reduced.

One attempt to address this situation is illustrated in FIG. 1 and involves the use of an inlet control valve 18 positioned upstream of the inlet 12 to the screw air compressor 10 and an inlet control valve regulator 20. In this system, when the product (i.e., nitrogen) flow demand decreases, the system experiences an increase in pressure. This increase in pressure works its way back through the system where it is eventually sensed by the inlet control valve regulator 20. When the pressure increase exceeds a predetermined level, the inlet control valve regulator 20 causes actuation of the compressor inlet control valve 18. The compressor inlet control valve 18 is thereby throttled to restrict the volume of air entering the compressor. This then tends to reduce the amount of air compressed by the screw air compressor 10 in an attempt to match the demand, and prevents component damage caused by overpressure.

It has been found, however, that this type of air inlet control has little effect on the power consumed by the screw air compressor 10. That is, even though the flow rate through the system has been reduced as a result of restriction of the inlet air volume, the compressor continues to draw power at a level that is close to that consumed during full-load conditions. Thus, there is little energy savings with this type of system.

Another attempt at addressing the aforementioned situation involves designing the compressor to include a feature which will hereinafter be referred to as a sliding port 22. For purposes of simplicity and ease of understanding, the sliding port 22 is schematically illustrated in FIG. 1 as being separate from the screw air compressor 10. In actuality, as shown in FIG. 2, the sliding port 22 actually forms a part of the screw air compressor 10.

With reference to FIG. 2, the screw air compressor 10 includes a casing 24 in which is located a pair of rotors 26. The rotors 26 are schematically shown in FIG. 2. The wall of the casing 24 is provided with a series of longitudinally arranged orifices 28 that can be covered or uncovered by way of the sliding port 22. In operation, an actuator associated with the sliding port 22 actuates the sliding port 22 in order to open or close the orifices 28 in the casing wall. With all of the orifices 28 closed, the entire length of the rotors 26 serves to compress air flowing through the inlet 12. By appropriately operating the sliding port 22 to expose one or more of the orifices 28, air in the casing 24 is returned to the inlet 12 before being compressed. Thus, the effective length of the rotors which acts to compress air is reduced. This results in a reduction in overall power consumption of the screw air compressor.

With reference once again to FIG. 1, a discharge pressure control regulator 30 senses the compressor discharge pressure. When the nitrogen flow demand decreases, the resulting increase in pressure makes its way back through the system where it is eventually sensed by the discharge pressure control regulator 30. When the pressure exceeds a predetermined value, the sliding port 22 is actuated to expose one or more of the orifices 28 in the casing wall. In that way, the amount of air to be compressed is reduced, thereby resulting in a decrease in power consumption.

Some systems will also utilize the sliding port 22 and the control valve 18 in series with one another. For example, the system can be designed such that the sliding port 22 is initially actuated when the pressure in the system exceeds a first predetermined value. Thereafter, if the pressure in the system continues to increase due to a further reduction in flow demand, the inlet control valve 18 is actuated to modulate the volume of air entering the screw air compressor. If the pressure in the system further increases, the compressor can be designed to unload so that all of the air in the compressor is vented to the atmosphere so that the compressor stops compressing. Thereafter, the compressor can be shut down.

Other systems sometime employ a buffer tank downstream of the screw air compressor. If the flow demand decreases while the screw air compressor is operating at full load capacity, the associated increase in product purity is attenuated slightly by the buffer tank which is located downstream of the air separation system. That is, product in the buffer tank which possesses a purity that is within specifications is mixed with the product having a higher purity. In that way, the increase in product purity is not as noticeable to the customer.

Although being useful in some respects, the systems described above are subject to certain drawbacks and are susceptible of improvements. For example, the operation of the sliding port 22 and the inlet control valve 18 requires sensing of an increased pressure in the system. However, pressure increases which result from decreases in flow demand typically are offset by the then reduced performance of the air separation system before they can be sensed by the regulators 20, 30. Thus, changes in product flow demand cannot be accompanied by appropriate reductions in the operating level of the compressor to thereby achieve lower power consumption. Consequently, energy is still expended unnecessarily.

Needless energy consumption also occurs because changes in product flow demand are oftentimes not accompanied by immediate pressure increases. Rather, product purity typically increases until the product flow demand decreases to an extent that causes a pressure increase which can be sensed by the regulators 20, 30. Thus, product purity in excess of that necessary is produced and this, of course, results in excessive energy use.

Additionally, buffer tanks are oftentimes quite large—in some instances several times the size of the entire nitrogen generator system. If space is limited, it may not be possible to employ a buffer tank. Moreover, buffer tanks which are large in size can be quite sensitive to environmental factors such as wind and earthquakes. This is a particularly significant concern given the fact that the buffer tank stores a large amount of gas which, if released into the atmosphere, could cause significant concerns. Finally, buffer tanks can be quite expensive and may require extensive foundation work.

In view of the foregoing, there exists a need for a control system for controlling an air compressor, and a nitrogen extraction system which includes such a control system and air compressor for providing a real load-follow capability so that product purity can be maintained regardless of reductions in product flow demand. Further, there exists a need for an air compressor control system and a nitrogen extraction system including such a control system for permitting reduced power consumption at lower product flow demands while also maintaining a constant product purity. It would also be desirable to increase the life and longevity of air compressors by avoiding needless and excessive compressor operating levels, and/or needless stops and starts.

SUMMARY OF THE INVENTION

In accordance with one aspect of the invention, a system for extracting nitrogen from air to produce a flow of nitrogen includes a compressor for compressing air and an air separator connected to the compressor for receiving compressed air from the compressor and for producing nitrogen from the compressed air. The compressor is operable at full capacity and less than full capacity, and includes a pair of rotatable rotors, an inlet through which air flows into the compressor and a reducing device for reducing an effective length of the rotatable rotors which acts to compress air in order to cause the compressor to operate at less than full capacity. An internal pressure control regulator operatively associated with the compressor regulates the discharge pressure from the compressor, and provides a signal air pressure when the compressor discharge pressure exceeds a predetermined pressure. An external input device allows an external signal indicative of a compressor operating level that is less than full capacity to be inputted and provides a signal air pressure based on the external signal. A selecting device connected to the internal pressure control regulator, the external input control device and the reducing means selects one of the signal air pressure from the internal pressure control regulator and the air signal pressure from the external input device, and outputs a control signal to the reducing device based on the selected signal to reduce the effective length of the rotatable rotors which acts to compress air so that the operating level of the compressor is externally controllable to vary nitrogen flow and nitrogen purity while also preventing an increase in pressure beyond the predetermined pressure when the compressor is operating at a reduced operating level.

According to another aspect of the invention a system for extracting nitrogen from air to produce nitrogen having a substantially constant purity in spite of fluctuations in flow demand includes a compressor for compressing air and an air separator connected to the compressor for separating nitrogen from compressed air received from the compressor. The compressor includes a pair of rotatable rotors, an inlet through which air flows into the compressor, a motor for driving the rotors and a reducing device for reducing an effective length of the rotatable rotors which acts to compress air in order to cause the compressor to operate at less than full capacity. An oxygen content analyzer which is located downstream of the air separator determines the oxygen content of nitrogen flowing out of the air separator and a pressure regulating device regulates the compressor discharge pressure exiting the compressor. The system also includes an operating device for causing operation of the reducing device when the compressor discharge pressure regulated by the pressure regulating means is greater than a predetermined value and for causing operation of the reducing means when the oxygen content analyzer determines that the oxygen content of the nitrogen exiting from the separator differs from a predetermined oxygen content so that the operating level of the compressor is changed in response to changes in nitrogen purity as determined by the oxygen content analyzer.

In accordance with another aspect of the invention, a system for compressing air is comprised of a screw compressor for compressing air. The screw air compressor includes a casing, a pair of rotatably driven rotors positioned in the casing, an inlet for allowing air to be introduced into the casing and a reducing arrangement that allows the effective length of the rotors which acts to compress air to be reduced so as to reduce an operating level of the compressor. An operation device is connected to the reducing arrangement for causing operation of the reducing arrangement in response to a signal air pressure. An external control device is connected to the operation device for sending a first signal to the operation device indicative of an externally inputted operating level for the compressor in order to cause operation of the reducing arrangement means so that the operating level of the compressor is changed to the manually inputted operating level. An automatic internal control which is connected to the operating device automatically sends a second signal to the operating device when a compressor discharge pressure from the compressor exceeds a predetermined pressure in order to cause operation of the reducing arrangement and a reduction in a current operating level of the compressor. The operation device causes operation of the reducing arrangement during a reduced operating level of the compressor upon receipt of the second signal from the automatic control to thereby further reduce the operating level of the compressor when the compressor is already operating at a reduced level.

BRIEF DESCRIPTION OF THE DRAWING FIGURES

Additional features and advantages of the present invention will be understood from the description below considered in conjunction with the drawing figures in which like elements bear like reference numerals and wherein:

FIG. 1 is a schematic illustration of a known system for extracting nitrogen from compressed air;

FIG. 2 is a schematic illustration of a known sliding port for controlling the amount of air compressed by the compressor;

FIG. 3 is a schematic illustration of one aspect of the present invention illustrating a nitrogen extraction system in which the compressor capacity is externally controlled; and FIG. 4 is a schematic illustration of another aspect of the present invention illustrating a nitrogen extraction system for maintaining constant product purity irrespective of changes in flow demand.

DETAILED DESCRIPTION OF THE PREFERRED EMBODIMENTS

With reference to FIG. 3, a nitrogen extraction system according to one aspect of the invention is designed to allow external control of the compressor operating level while at the same time maintaining the internal control based on compressor discharge pressure. The system includes a screw air compressor 40 that is provided with a sliding port and sliding port actuator 42 similar to that illustrated in FIG. 2 for changing the effective length of the pair of rotors which acts to compress air. The system also includes an inlet control valve regulator 44 and an inlet control valve 46 similar to the inlet control valve regulator 20 and the inlet control valve 18 described above and illustrated in FIG. 1. The system is also provided with a cleaner 48 and an air separation system 50 disposed downstream of the screw air compressor 40.

In accordance with one aspect of the embodiment illustrated in FIG. 3, a proportional control of the compressor capacity can be achieved. A discharge pressure control regulator 52 is disposed downstream of the screw air compressor 40 and is subject to the compressor discharge pressure. Similarly, a line regulator 54 is disposed downstream of the screw air compressor and is subject to the compressor discharge pressure. The line regulator 54 is connected to one input port of a transducer 56. The line regulator 54 functions to reduce or knock down the prevailing pressure in the system downstream of the screw air compressor 40 to avoid damaging the transducer 56. The transducer 56 can be a current-to-pressure transducer or, if appropriate, a voltage-to-pressure transducer.

Another input port of the transducer 56 is connected to an external input control device or analog electrical device 58 which allows an external input control signal indicative of a desired product flow rate or compressor operating level to be sent to the transducer 56. This external input control signal can be manually input by an operator in order to set or vary a desired operating level of the compressor. The external input control device 58 can take the form of a dial or other similar device for inputting an external input control signal. The transducer 56 reduces the signal sent from the line regulator 54 by a certain percentage or amount depending upon the signal sent from the control device 58.

The system also includes a pneumatic select relay 60 which is designed to select the highest of either the pressure signal produced by the discharge control regulator 52 or the pressure signal produced by the transducer 56.

During operation of the aspect of the embodiment of the system described above, when no external input control signal is inputted by way of the control device 58, the compressor 40 will run at full capacity. That is, if there is no signal sent from the external input control device 58, the transducer 56 is designed to send none of the compressor discharge pressure from the regulator 54 to the pneumatic select relay 60. As a result, the pneumatic select relay 60 will send the input from the discharge pressure control regulator 52 to the sliding port actuator 42. Thus, in this situation, the screw air compressor 40 operates in much the same manner as the system illustrated in FIG. 1. The internal control mode of the system automatically controls the operating level of the compressor so that the compressor operating level is varied as a function of the pressure downstream of the screw air compressor 40 (i.e., the compressor discharge pressure). If, during this internal control mode, the compressor discharge pressure exceeds a predetermined pressure, thereby indicating that flow demand has been reduced, the sliding port actuator and sliding port 42 will become operable to thereby reduce the operating level of the compressor.

If an operator desires to externally throttle back the compressor operating level in order to reduce the product flow rate at the downstream end of the system, an external control signal is inputted to the control device 58 (e.g., by way of a dial), thereby increasing the signal which is sent to the transducer 56 from the external control device 58. Depending upon the magnitude of this signal, a certain percentage of the regulated air pressure from the line regulator 54 will pass through to the pneumatic select relay 60. This will then cause the air pressure signal originating from the transducer 56 to be greater than the air pressure signal from the internal regulator 52. Thus, the pneumatic select relay 60 switches so as to select the external pressure signal inputted to the control device 58. The external pressure signal is then channeled to the sliding port and sliding port actuator 42, thereby causing the sliding port to move. As a result, the compressor operating level or compressor capacity is modulated as a function of the external signal inputted to the control device 58. Thus, the external input control device allows the product flow rate to be adjusted or changed as desired.

One significant advantage of the system illustrated in FIG. 3 and described above is that the use of the external input control device does not override or do away with the internal control arrangement which controls pressure rises in the system. In other words, when the system is operating at reduced capacity as a result of an external input from the control device 58, the internal control of the system is still maintained. Thus, when the compressor is operating at less than full capacity and the compressor discharge pressure begins to rise (e.g., as a result of a further decrease in product demand), the internal regulator 52 will begin to open, as it would during normal operation, when the compressor discharge pressure exceeds a predetermined pressure. Consequently, the air pressure signal inputted to the pneumatic select relay 60 from the internal regulator 52 will also rise. When the air pressure signal from the internal regulator 52 exceeds the air pressure signal from the transducer 56 the pneumatic select relay 60 will switch and select the air pressure signal from the internal regulator 52. Thus, the slide port and slide port actuator 42 will once again become operational and be subject to the internal control of the system for purposes of further throttling the operating level of the compressor.

Quite advantageously, the transfer of operation of the compressor between the external control mode and the internal control mode occurs automatically and the transition between the external and internal control modes is bumpless.

When the compressor discharge pressure once again decreases, the internal regulator 52 will once again close and bleed any entrapped air. When the internal air pressure signal decreases to a level below the external air pressure signal emanating from the transducer 56, the pneumatic select relay 60 once again switches back so that the compressor operating level is controlled by the external control signal originating from the control device 58.

It can be seen, therefore, that if the transducer 56 fails, the external control signal air pressure will collapse. However, in such a situation, the internal pressure signal from the internal regulator 52 will control the operating level of the compressor. Thus, the system is fail-safe in the event the external control device becomes inoperable.

The system illustrated in FIG. 3 is advantageous as it allows the compressor operating level to be controlled externally by an operator. Thus, an operator can reduce the compressor operating level to achieve a reduction in product flow by simply inputting an external control signal. Unlike other known types of systems in which the compressor operating level is reduced only after the pressure rise associated with a decrease in flow demand rises to a certain level and makes its way back through the system, the present invention allows an immediate change in the operating level of the compressor.

Additionally, the system of the present invention is adaptable to a wide range of applications. The process or design requirements on some air separation systems necessitate that the feed air pressure be reduced below the normal operating level in certain instances, such as when the internal energy of the feed air reaches a level at which the internal parts of the system could become damaged or the air separation process could become disturbed. The system of the present invention maintains the internal control which regulates the feed air pressure so that damage to the system does not occur. Further, the present invention can be used in conjunction with existing systems, thereby making it well suited for use in a variety of applications.

The external control system described above may also be advantageous in certain applications when initiating operation of the system. For example, if the particular application involves filters in the system piping, an immediate ramp-up to full compressor capacity could cause damage to the filters. On the other hand, a gradual ramp-up to full compressor capacity is desirable as it reduces the possibility that such damage will occur. The embodiment of the invention described above allows achievement of that objective. Also, providing an external control for the compressor allows the system to maintain a substantially constant product purity in spite of changes in flow demand. This also allows realization of significant savings in the energy requirements of a system. Further, the compressor operating temperature can be reduced, thereby achieving increased machinery and lubricant life.

It is to be noted also that the system illustrated in FIG. 3 can be designed so that the output from the pneumatic select relay 60 is connected to the inlet control valve 46 to thereby throttle the air entering the compressor. This particular arrangement may be useful, for example, as an alternative to the use of the sliding port and sliding port actuator 42.

The embodiment of the system illustrated in FIG. 3 can be modified slightly in accordance with another aspect of the invention to achieve a system which has other uses and applications. In particular, the analog electrical input device 58 can be replaced with a digital electrical device such as an on/off switch while the transducer 56 is replaced with a solenoid valve. The in-line pressure regulator 54 regulates pressure downstream of the regulator 54. A system having these alternative features is quite useful in the context of an environment which initially requires full compressor capacity, but which later requires less than full operating capacity. For example, in the case of fruit storage, fruit (e.g., apples) is stored in a nitrogen-filled room for purposes of extending shelf life and inhibiting the onset of ripeness. After being picked, the fruit is placed in a room that must then be filled with nitrogen. The initial filling of the room with nitrogen requires a full operating capacity of the compressor (i.e., the turbo mode) while subsequent maintenance of the nitrogen level in the room requires a considerably reduced operating level (i.e., normal operating level). The alternative system described above allows the compressor to be appropriately operated in this manner.

In the turbo mode in which the room is initially filled, the switch 58 is off so that no signal is sent to the solenoid valve 56. Thus, the solenoid valve 56 remains closed, and the line between the select relay 60 and the solenoid valve 56 is vented to the atmosphere as a result of the valve solenoid valve 56 being vented. In this operating mode, the compressor operates at full capacity.

Once the room is filled to the desired level with nitrogen, the system is changed to the normal mode by turning the switch 58 on so that the solenoid valve 56 is opened. The pressure regulated by the regulator 54 is thus received by the select relay 60. The operating capacity of the compressor 40 is thereby reduced to a level that is determined by suitable adjustment of the line regulator 54 (a specific adjustment feature in the regulator is not shown). If it happens during the normal operation mode that the pressure in the system exceeds the pressure set by the regulator 52, the internal control takes over to control the operating level of the compressor.

Thus, this alternative aspect of the embodiment of the system does away with the need for dual compressors and engines which would normally be employed to provide the same turbo/normal modes of operation.

FIG. 4 illustrates a nitrogen extraction system according to another aspect of the present invention. In this system, a substantially constant product purity can be automatically maintained regardless of variations in product flow demand. The system includes a screw air compressor 70 provided with a sliding port and sliding port actuator 72 for controlling the volume of air compressed by the screw air compressor 70. An air separation system 74 is disposed downstream of the screw air compressor 70 to extract nitrogen from the air that has been compressed by the screw air compressor 70. The air separation system 74 is outfitted with a purge vent line 75 for venting the byproduct resulting from the compressed air after the nitrogen has been extracted.

A process measuring device such as a pressure sensor, flow sensor or oxygen product analyzer 76 is positioned downstream of the air separation system 74 and upstream of a three-way switching valve 78. The oxygen content analyzer 76 analyzes the amount of oxygen present in the extracted nitrogen exiting from the air separation system 74. The oxygen content analyzer 76 can be provided with a manually operable setting device (e.g., a dial) for setting the desired oxygen content for the system. The oxygen content analyzer 76 then determines whether the oxygen content of the product differs from the set value.

If the oxygen content analyzer 76 determines that the product purity does not meet the specifications of the system, a Hi/Lo alarm 84 is sounded and a signal is sent to the three-way switching valve 78. The signal sent to the three-way switching valve 78 causes the product to be vented to a vent line 82. In that way, the product whose purity is not within the specification limits is not conveyed downstream for its intended use.

A back-pressure regulator 80 is disposed upstream of the three-way switching valve 78 for limiting the product flow to a maximum, thereby maintaining the maximum oxygen content under a certain threshold. This regulator 80 controls the maximum back pressure acting in the air separation system 74, and the amount of back pressure acting on the system 74 dictates the oxygen content of the resulting product. Thus, by appropriately adjusting or regulating the regulator 80, the oxygen content of the product can be controlled.

When the oxygen content analyzer 76 determines that the oxygen content in the nitrogen product is higher or lower than the system specifications, an output analog signal is sent to a transducer 86 (from the analyzer 76 or from a separate device) which in turn sends an appropriate pressure signal to a pneumatic select relay 88. As in the case of the system illustrated in FIG. 3, the pneumatic select relay 88 selects the higher of the pressure signal from the transducer or the pressure signal from the discharge pressure control regulator 90. The pressure signal selected by the pneumatic select relay 88 then serves as the basis for controlling the sliding port and sliding port actuator 72 to vary the operating capacity of the screw air compressor 70.

During operation, if the compressor discharge pressure increases above a predetermined level while the compressor 70 is operating at full capacity, the signal input to the pneumatic select relay 88 from the regulator 90 will be higher than the pressure signal from the transducer 86. As a result, the sliding port 72 will become automatically operational to thereby throttle back or reduce the operating level of the compressor 70.

On the other hand, if the compressor 70 is operating at full capacity and the product flow demand decreases, the purity of the nitrogen product will increase (i.e., the oxygen content in the nitrogen product will decrease) since the air compressor 70 continues to operate at full capacity. The oxygen content analyzer 76 will output an analog signal to the transducer 86 which will then send a pressure signal to the pneumatic select relay 88 that is higher than the pressure signal from the regulator 90 that is representative of the compressor discharge pressure. As a result, the sliding port will become operational to decrease the energy output by the compressor.

It is to be noted that the signal from the oxygen content analyzer may be conditioned through a PID (proportional integral derivative) loop controller.

If the air compressor 70 is operating at a reduced level as a result of the oxygen content analyzer 76 having sensed an oxygen content that does not meet the system specifications, an increase in the compressor discharge pressure will cause a pressure signal to be sent to the pneumatic select relay 88 from the regulator 90 that is higher than the pressure signal from the transducer 86. Thus, the sliding port and sliding port actuator 72 will once again become operational to further throttle the operating capacity of the compressor 70.

The system shown in FIG. 4 possesses many of the same advantages mentioned above in connection with the system illustrated in FIG. 3 insofar as increasing the life and longevity of the compressor by controlling the operating level of the compressor.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A system for extracting nitrogen from air to produce a flow of nitrogen, comprising:

a compressor for compressing air, said compressor being operable at full capacity and less than full capacity, said compressor including a pair of rotatable rotors, an inlet through which air flows into the compressor and reducing means for reducing an effective length of the rotatable rotors which acts to compress air in order to cause the compressor to operate at less than full capacity;

an air separator connected to the compressor for receiving compressed air from the compressor and producing nitrogen from the compressed air;

an internal pressure control regulator operatively associated with the compressor for regulating discharge pressure from the compressor, said internal pressure control regulator being operable to provide a signal air pressure when the compressor discharge pressure exceeds a predetermined pressure;

an external input means for inputting an external signal indicative of a compressor operating level that is less than full capacity and for providing a signal air pressure based on the external signal;

selecting means connected to the internal pressure control regulator, the external input control device and the reducing means for selecting one of the signal air pressure from the internal pressure control regulator and the signal air pressure from the external input means, and for outputting a control signal to the reducing means based on the selected signal to reduce the effective length of the rotatable rotors which acts to compress air so that the operating level of the compressor is externally controllable to vary nitrogen flow and nitrogen purity while also preventing an increase in pressure beyond the predetermined pressure when the compressor is operating at a reduced operating level.

2. A system according to claim 1, wherein the external input means includes an external input device and a transducer, said transducer being connected to the external input device and the selecting means for changing an external signal inputted to the external input device into a signal air pressure.

3. A system according to claim 2, wherein the selecting means is a pneumatic select relay.

4. A system for extracting nitrogen from air to produce nitrogen having a substantially constant purity in spite of fluctuations in flow demand, comprising:

a compressor for compressing air, said compressor including a pair of rotatable rotors, an inlet through which air flows into the compressor, a motor for driving the rotors and reducing means for reducing an effective length of the rotatable rotors which acts to compress air in order to cause the compressor to operate at less than full capacity;

an air separator connected to the compressor for separating nitrogen from compressed air received from the compressor;

a back-pressure regulator located downstream of the air separator for limiting nitrogen product flow;

an oxygen content analyzer located between the air separator and the back-pressure regulator for determining an oxygen content of nitrogen product flowing out of the air separator;

pressure regulating means for regulating a compressor discharge pressure exiting the compressor;

means for causing operation of the reducing means when the compressor discharge pressure regulated by the pressure regulating means is greater than a predetermined value and for causing operation of the reducing means when the oxygen content analyzer determines that the oxygen content of the nitrogen exiting from the separator differs from a predetermined oxygen content, so that the operating level of the compressor is changed in response to changes in nitrogen purity as determined by the oxygen content analyzer.

5. A system according to claim 4, including a transducer for transforming a signal output by the oxygen content analyzer into a signal air pressure, said pressure regulating means outputting a signal air pressure indicative of the compressor discharge pressure, said means for causing operation of the reducing means including a pneumatic select relay for selecting the higher of the signal air pressure generated by the transducer and the signal air pressure from the pressure regulating means.

6. A system according to claim 5, including a three-way valve positioned downstream of the back-pressure regulator for diverting flow when the oxygen content analyzer determines that the oxygen content in the nitrogen differs from the predetermined oxygen content.

7. A system for compressing air comprising:

a screw air compressor for compressing air, said screw air compressor including a casing, a pair of rotatably driven rotors positioned in the casing, an inlet for allowing air to be introduced into the casing and reducing means for reducing an effective length of the rotors which acts to compress air so as to reduce an operating level of the compressor;

operation means connected to the reducing means for causing operation of the reducing means in response to a signal air pressure;

external control means connected to the operation means for sending a first signal to the operation means indicative of an externally inputted operating level for the compressor in order to cause operation of the reducing means so that the operating level of the compressor is changed to the externally inputted operating level;

automatic internal control means connected to the operation means for automatically sending a second signal to the operation means when a compressor discharge pressure from the compressor exceeds a predetermined pressure in order to cause operation of the reducing means and reduce a current operating level of the compressor to a reduced operating level, the operation means causing operation of the reducing means during a reduced operating level of the compressor upon receipt of the second signal from the automatic control means to thereby further reduce the operating level of the compressor.

8. A system according to claim 7, wherein said operation means includes a pneumatic select relay which selects one of the first and second signals.

9. A system according to claim 8, wherein said operation means includes a pneumatic select relay which selects the higher of the first signal or the second signal in order to cause operation of the reducing means.

10. A system according to claim 9, including an input device for manually inputting a desired operating level of the compressor.

11. A system according to claim 7, wherein said external control means includes an on/off switch connected to an openable and closable solenoid valve, said solenoid valve being opened when the on/off switch is in a first operational position so that the reducing means is controlled by the external control means, and said solenoid valve being closed when the on/off switch is in a second operational position so that the reducing means is controlled independent of the external control means.

* * * * *